P. UTNE.
ALTERNATING CURRENT MOTOR.
APPLICATION FILED MAR. 25, 1909.
964,714.
Patented July 19, 1910.
2 SHEETS—SHEET 1.
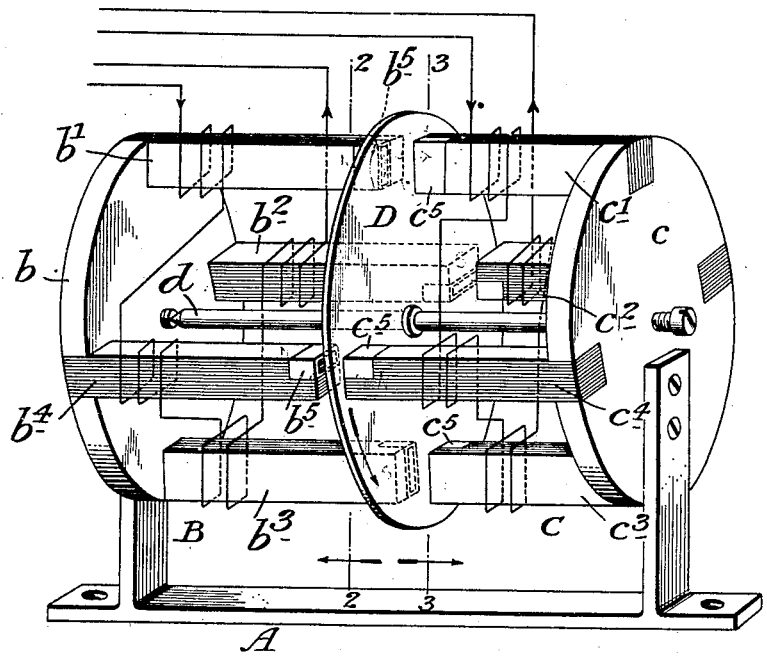
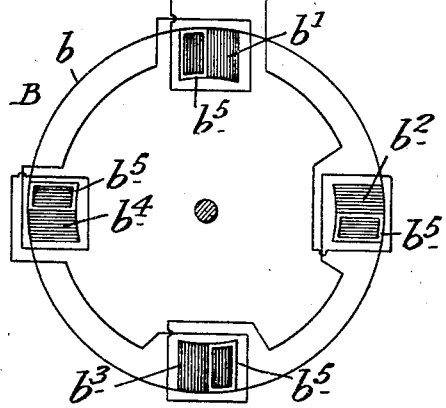
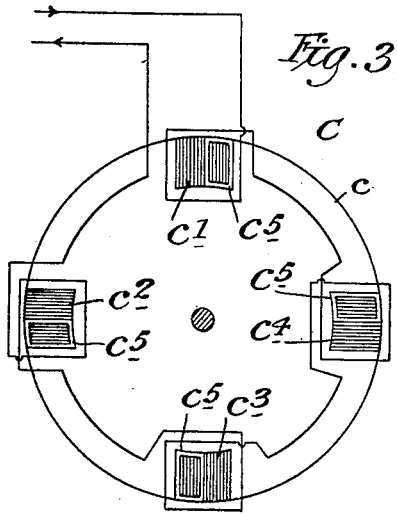
Witnesses:
Inventor
Per Utne
By his Attorney

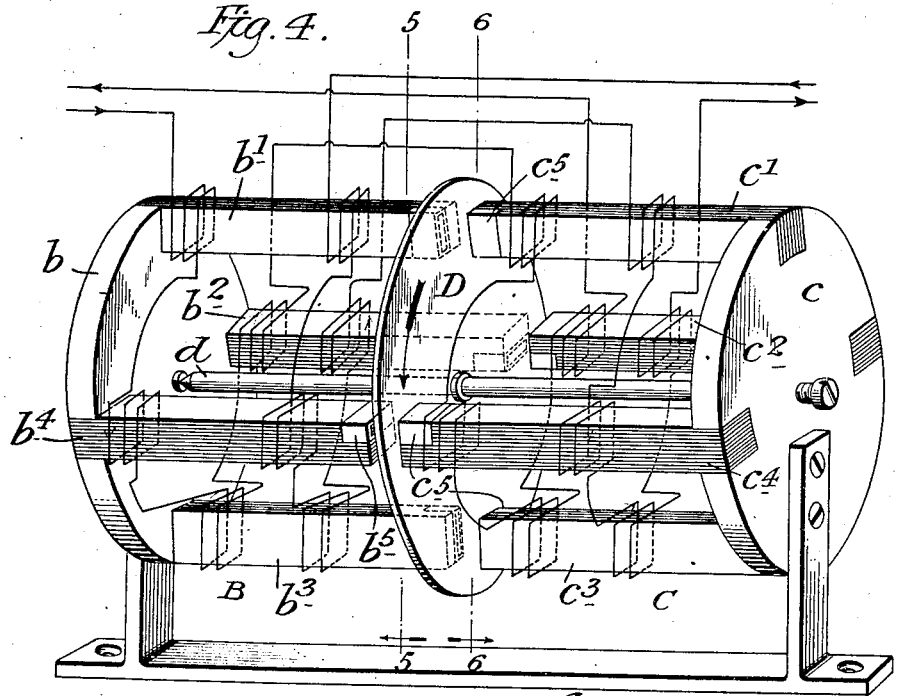
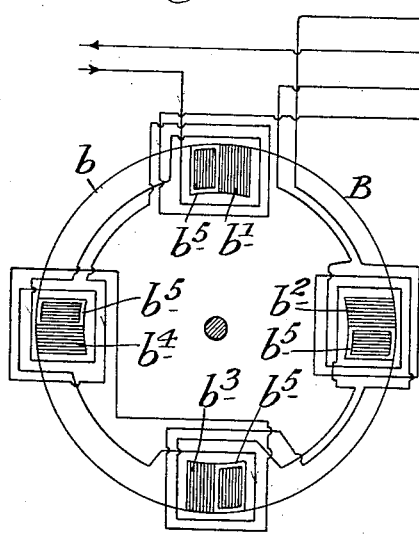
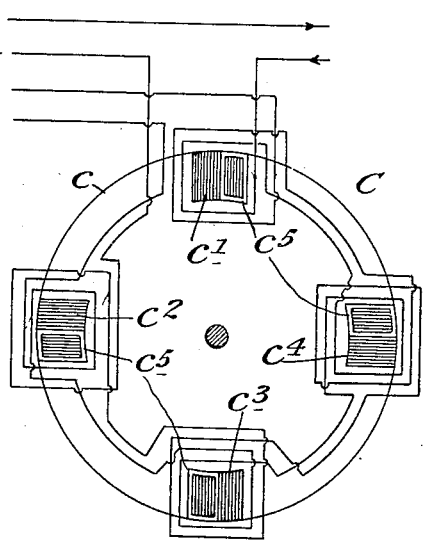

UNITED STATES PATENT OFFICE.

PER UTNE, OF NEW YORK, N. Y., ASSIGNOR TO THE UNION SWITCH & SIGNAL COMPANY, OF SWISSVALE, PENNSYLVANIA, A CORPORATION OF PENNSYLVANIA.

ALTERNATING-CURRENT MOTOR.

964,714.      Specification of Letters Patent.      Patented July 19, 1910.

Application filed March 25, 1909. Serial No. 485,693.

*To all whom it may concern:*

Be it known that I, PER UTNE, a subject of the King of Norway, and a resident of the United States, in the borough of Manhattan, city, county, and State of New York, have invented certain new and useful Improvements in Alternating-Current Motors, of which the following is a specification.

My invention relates to electric motors, the rotatable part of which is of non-magnetic metallic material and is to rotate by alternating currents flowing in the windings of two oppositely arranged magnets constituting the stationary or field member of the motor.

My invention has particular reference to a motor operable by alternating currents which may advantageously be used in signaling systems for railroads, both electric and steam.

I will describe a motor embodying my invention, and then point out the novel features thereof in claims.

In the accompanying drawings Figure 1 is a view partly in perspective and partly in diagram of a motor operable by alternating current and embodying my invention. Fig. 2 is a view in vertical cross-section, taken on the line 2—2 of Fig. 1. Fig. 3 is also a view in vertical cross-section taken on the line 3—3 of Fig. 1. Fig. 4 is a view similar to Fig. 1, but showing a modification of my invention. Fig. 5 is a view in vertical cross-section taken on the line 5—5 of Fig. 4. Fig. 6 is also a view in vertical cross-section taken on the line 6—6 of Fig. 4.

Similar letters of reference designate corresponding parts in all of the figures.

Referring now more particularly to Figs. 1, 2 and 3, A designates a suitable base, framework or support upon which are suitably mounted two magnets B, C, constituting the field of the motor. The magnet B comprises a part $b$ carrying a plurality of laminated pole pieces $b^1$, $b^2$, $b^3$ and $b^4$—the ends of which are split or bifurcated. Around one of the bifurcations of each pole piece is a closed conductor $b^5$—preferably in the form of a copper ferrule. Similarly the magnet C comprises a part $c$, carrying a plurality of laminated pole pieces $c^1$, $c^2$, $c^3$, and $c^4$, the ends of which are split or bifurcated. Also around one of the bifurcations of each pole piece is a closed conductor $c^5$—preferably in the form of a copper ferrule. The pole pieces of the two magnets are oppositely arranged in a manner similar to that shown in the drawings. Of course the number of pole-pieces may be more than the number shown in the drawings, so long as there are oppositely arranged pairs. D designates an armature here shown as consisting of a metallic disk of some non-magnetic material.

The armature D, located between the oppositely arranged pole-pieces, is fixed upon a shaft $d$, the ends of which are suitably journaled in the parts $b$ and $c$, so that it may be rotated. Each pole piece of each of the magnets B, C is provided with a winding, and all of the windings on the magnet B will be in series and all of the windings on the magnet C will be in series. The windings on the magnet B are so arranged that at any one instant two of the pole-pieces at their ends opposite the armature D will be of one polarity, while at the same instant the other two pole-pieces at their ends opposite the armature D will be of the opposite polarity. For example, and as shown in the drawings, the windings on the pole-pieces $b^1$, $b^4$ are so arranged that at any one instant their ends adjacent the armature D will be north poles, and the windings on the pole-pieces $b^3$, $b^2$, are so arranged that at the same instant their ends adjacent the armature D will be south poles. Similarly the windings on the pole-pieces $c^1$, $c^2$, of the magnet C are so arranged that at any one instant their ends adjacent the armature D will be of one polarity while the windings on the pole-pieces $c^3$, $c^4$ are so arranged that the same instant their ends adjacent the armature D will be of the opposite polarity. Also, in accordance with my invention, at the same instant that the ends of the pole-pieces $b^1$, $b^3$, are of one polarity the adjacent ends of the pole-pieces $c^1$, $c^3$ will be of the opposite polarity. In other words, when the end of the pole-piece $b^1$, adjacent the armature D, is a north pole, the adjacent end of the pole-piece $c^1$ is a south pole, and when the ends of the pole-piece $b^3$, adjacent the armature D is a south pole, the adjacent end of the pole-piece $c^3$ is a north pole. Thus it will be seen that a magnetic circuit will be established from—say the pole-piece $b^1$ through the part $b$, pole-piece $b^3$, armature D, pole-piece $c^3$ part $c$, pole-piece $c^1$ and armature D to the pole-piece $b^1$. Therefore, with alternating currents flowing in the windings on the pole-pieces, $b^1$, $b^3$, of the magnet B, magnetic flux will flow in the magnetic path just described, which will induce currents in the closed conductors $b^5$ on these pole-pieces as well as in the metallic armature D.

The induced currents in the armature D will encircle the total amount of magnetic flux that passes from one pole-piece to the other and run in the same direction as the currents in the closed conductors $b^5$ but on a different center. The ferrules $b^5$ being fixed on one side of the pole-pieces, it remains for the currents in the armature to center themselves in the proper relation to the closed and fixed conductors $b^5$. The armature being a continuous conductor, is constantly presenting different portions within the magnetic fields, the result being the rotation of the armature in one direction. This principle is well understood in the electrical art. If, also, an alternating current of the same frequency as the frequency of the alternating current flowing in the coils on the pole-pieces $b^1$, $b^3$ of the magnet B, flows in the windings on the pole-pieces $c^1$, $c^3$ of the magnet C, precisely the same magnetic action takes place as described in connection with the magnet B, so that the turning torque on the armature D is increased. At the same time the alternating currents flowing in the windings on the pole-pieces $b^2$, $b^4$, and $c^2$, $c^4$, produce alternating magnetic fields which counteract one another so that they produce no turning torque in either direction on the armature D. This neutralization is due to the fact that the end of the pole-piece $b^2$ adjacent the armature D is of a south polarity, as is also the end of the adjacent pole-piece $c^2$. If now, the flow of alternating current in either of the magnets B, C, should be reversed, the ends of the pole pieces $b^1$, $b^3$, $c^1$, $c^3$, which were of opposite polarity would become of like polarity, while the ends of the pole pieces $b^2$, $b^4$ $c^2$, $c^4$ which were of like polarity would become of unlike or opposite polarity; so that these latter poles would exert a turning torque on the armature D to have it rotate in a reverse or opposite direction.

It will be understood, of course, that the closed conductors $b^5$, $c^5$, are so arranged on the pairs of pole pieces as to cause rotation of the armature D in one or the other directions, according to which set of pole pieces has its adjacent ends of opposite polarities.

Referring now to Figs. 4 to 6, inclusive, the arrangement of parts as illustrated is the same as that of Figs. 1 to 3, except that the windings of the magnet B are continued onto the magnet C and the windings of the magnet C are continued onto the magnet B in equal parts, the advantage being to strengthen the magnetic fields of the pole pieces equally upon any increase of strength of current from either of the two sources of alternating current from which the windings of the magnets B and C are energized.

The alternating currents for the energizing windings of the magnets B and C should be of the same frequency, for these windings may be supplied from the same source or from different sources. It will be seen, therefore, that my invention provides for an alternating current motor, having a rotatable armature of non-magnetic metal, and two oppositely arranged magnets each having at least two sets of pole-pieces, one set of pole pieces of each magnet acting in conjunction with each other to produce a turning torque on the armature in one direction while at the same time the other set of pole pieces of each magnet neutralize each other to produce no turning torque on the armature; and that upon a reversal of the direction of flow of alternating current of the same frequency in the winding of either of the magnets, the relations of the effects of the sets of pole-pieces are changed so that those which first acted to produce a turning torque on the armature now act to neutralize each other or produce no turning torque, while those which first acted to neutralize each other to produce no turning torque now co-act to produce a turning torque on the armature, but in an opposite or reverse direction. It will also be apparent that my invention provides for a motor which is only operable by two alternating currents of the same frequency.

Having thus described my invention, what I claim as new is:

1. In an alternating current motor, the combination with a rotatable non-magnetic metal armature, a pair of magnets each having a plurality of pole-pieces arranged on opposite sides of said armature, and means for polarizing said pole-pieces to have certain of them to co-act to produce a turning torque on the armature in one direction, while the others neutralize each other to produce no turning torque on the armature.

2. In an alternating current motor, the combination with a rotatable non-magnetic metal armature, a pair of magnets each having a plurality of pole-pieces arranged on opposite sides of said armature, and means comprising a winding for each magnet for causing a co-acting polarization of certain of the pole-pieces of both magnets to produce a turning torque on the armature in one direction upon a flow of alternating currents in one direction in said windings and a co-acting polarization of certain other pole-pieces of both magnets to produce a turning torque on the armature in a reverse direction upon a change in direction of a flow of alternating current in either of the windings.

3. In an alternating current motor, the combination with a rotatable non-magnetic metal armature, a pair of magnets each having a plurality of pole-pieces arranged opposite each other, with the armature between them, and each having a bifurcated end, a closed conductor around a bifurcation of each pole-piece, and a winding for each magnet arranged on the pole-pieces to have the magnetic fields of certain of the pole-pieces of each magnet co-act to produce a turning torque on the armature and the magnetic fields of certain other pole-pieces to neutralize one another in their tendency to produce a turning torque on the armature.

In testimony whereof, I have signed my name to this specification in the presence of two subscribed witnesses.

P. UTNE.

Witnesses:
G. A. GAUGHAN,
W. F. WOOD.